United States Patent
Guzmann et al.

(10) Patent No.: US 7,459,513 B2
(45) Date of Patent: Dec. 2, 2008

(54) ACRYLIC-ACID-BASED HOMOPOLYMERS COMPRISING TAURINE MODIFIED FOR THE TREATMENT OF WATER

(75) Inventors: Marcus Guzmann, Muehlhausen (DE); Karl-Heinz Buechner, Altlussheim (DE); Pia Baum, Weinheim (DE); Gregor Brodt, Heppenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/578,616

(22) PCT Filed: Nov. 5, 2004

(86) PCT No.: PCT/EP2004/012542

§ 371 (c)(1), (2), (4) Date: May 8, 2006

(87) PCT Pub. No.: WO2005/044868

PCT Pub. Date: May 19, 2005

(65) Prior Publication Data

US 2007/0093609 A1 Apr. 26, 2007

(30) Foreign Application Priority Data

Nov. 7, 2003 (DE) ................. 103 52 457

(51) Int. Cl.
*C08F 20/06* (2006.01)

(52) U.S. Cl. ............. 526/317.1; 526/318; 526/319; 526/325; 526/329.7

(58) Field of Classification Search ............ 526/317.1, 526/318, 319, 325, 329.7, 307.3, 287
See application file for complete search history.

(56) References Cited

U.S. PATENT DOCUMENTS

| | | | | |
|---|---|---|---|---|
| 3,898,037 A | * | 8/1975 | Lange et al. | 422/16 |
| 4,301,266 A | * | 11/1981 | Muenster et al. | 526/212 |
| 4,450,013 A | * | 5/1984 | Hirsch et al. | 524/424 |
| 4,604,431 A | * | 8/1986 | Fong et al. | 525/351 |
| 4,640,793 A | | 2/1987 | Persinski et al. | |
| 4,711,725 A | * | 12/1987 | Amick et al. | 210/701 |
| 4,756,881 A | | 7/1988 | Hoots et al. | |
| 4,801,388 A | | 1/1989 | Fong et al. | |
| 2003/0050404 A1 | | 3/2003 | Kroner et al. | |

FOREIGN PATENT DOCUMENTS

| | | |
|---|---|---|
| DE | 103 20 388 | 11/2004 |
| EP | 0 244 584 | 11/1987 |
| EP | 0 330 876 | 9/1989 |

* cited by examiner

*Primary Examiner*—Ling-Siu Choi
(74) *Attorney, Agent, or Firm*—Oblon, Spivak, McClelland, Maier & Neustadt, P.C.

(57) ABSTRACT

A description is given of (meth)acrylic acid copolymers containing methacrylic acid units, the polymer being functionalized with aminoalkylsulfonic acid. In addition, a description is given of a process for preparation thereof and use thereof for water treatment, scale inhibition in petroleum production and corrosion inhibition in aqueous systems.

4 Claims, No Drawings

ACRYLIC-ACID-BASED HOMOPOLYMERS COMPRISING TAURINE MODIFIED FOR THE TREATMENT OF WATER

BACKGROUND OF THE INVENTION

1. Field of the Invention

The present invention relates to a process for preparing (meth)acrylic acid copolymers, the (meth)acrylic acid copolymers obtainable by this process, and also their use for water treatment, preferably in cooling and heating processes, and in the inhibition of scale in petroleum production.

2. Description of the Background

In petroleum production, owing to temperature changes and mixing of oilfield water with injection water, precipitates of carbonates and sulfates of the alkaline earth metals occur during the production process. They block the pores of the formation and accumulate on pipe surfaces, which makes production difficult and sometimes impossible.

In the treatment of water, in cooling or heating processes, including seawater desalination, or in heat transfer processes in general, to the respective cooling or heating medium are generally added formulations which prevent, or at least greatly delay, the corrosion and deposition in the circuits. For this are used formulations which comprise, according to requirements, zinc salts, polyphosphates, phosphonates, polymers, biocides and/or surfactants.

To master corrosion protection and antiscaling in open cooling circuits, a distinction is made in principle between two processes:

Firstly, phosphorus-containing formulations can be used in the cooling and heating media. Typical examples of these are polyphosphates and phosphonates such as 1-hydroxyethane-1,1-diphosphonic acid (HEDP), 2-phosphonobutane-1,2,4-tri-carboxylic acid (GBTC) and aminotrimethylenephosphonic acid (ATMP), each of which is used in the form of its sodium salt. These phosphorus-containing formulations generally effect hardness stabilization. Polyphosphates, furthermore, enhance the corrosion inhibition.

Alternatively, in cooling and heating media, zinc salts can also be used, in which case the zinc ions present therein chiefly serve to protect steel.

In some cases, zinc salts in small amounts are also added to the phosphonates in order, in addition to hardness stabilization, to simultaneously protect the steel used. The actions of these additives are reinforced by suitable polymers:

Suitable polymers can firstly reinforce the action of phosphonates for hardness stabilization and, secondly, they can also stabilize polyphosphates, in particular when these are added at high concentrations. This prevents calcium phosphate precipitation. In addition, suitable polymers can also stabilize zinc compounds so that deposition on the metal surface, and thus destruction of the protective film, does not occur. The anticorrosive action is explained in the example of phosphonates by the fact that a film forms on the metal surface. This separates the steel from the cooling or heating medium. The film which forms consists for the most part of iron(II) and calcium ions and the included phosphonate. It is extremely thin so that stabilization must ensure the prevention of breakdown and the possibility of corrosion occurring at individual points.

Polymers suitable for stabilizing phosphonates and phosphates are in principle known from the prior art. Thus, for example, EP-A 0 244 584 describes, for example, N-substituted acrylamides which bear sulfoethylamide groups and are used for corrosion inhibition of industrial cooling circuits. These N-substituted acrylamides are prepared by transamidation of polymeric acrylamides. The N-substituted acrylamides according to EP-A 0 244 584 inhibit the phosphate ions, but not the phosphonate ions.

EP-B 0 330 876 describes N-substituted acrylamides which are structurally analogous to EP-A 0 244 584. The use as claimed in EP-B 0 330 876 of these N-substituted acrylamides relates, however, to stabilizing iron in aqueous systems, with the exact degree of amidation of the N-substituted acrylamides used not being disclosed.

U.S. Pat. No. 4,801,388 describes processes to inhibit deposits in aqueous systems by adding polymers based on (meth)acrylic acid and sulfoalkyl(meth)acrylamide or (meth)acrylamide.

U.S. Pat. No. 4,604,431 describes a process for preparing acrylamidoalkylsulfonic acid by reacting acrylic acid or methacrylic acid-group-containing polymers with alkylsulfonic acids under pressure and at elevated temperature. U.S. Pat. No. 4,756,881 discloses the use of polymers containing acrylamidoalkanesulfonic acids in combination with organic phosphates for corrosion inhibition in industrial cooling waters.

The polymers of the abovementioned prior art have the disadvantage that they precipitate at relatively high calcium concentrations. In particular, in the case of the joint use of phosphonate ions and zinc ions in cooling or heating circuits, in addition, polymers are advantageous which act simultaneously in a stabilizing manner both toward phosphonate ions and also toward zinc ions. In addition, polymers are advantageous which, when polyphosphate additives are used, and in particular in the presence of calcium ions at high concentration, inhibit a precipitation of calcium phosphate. Finally, polymers are desirable which generally disperse solid particles, so that their deposition on the metal surfaces of the cooling or heating systems is avoided. These requirements are not met, or are met only inadequately, by the polymers of the prior art.

SUMMARY OF THE INVENTION

It is an object of the present invention, therefore, to provide a process for preparing polymers which, in cooling or heating circuits, in the respective medium, reinforce the hardness-stabilizing action of phosphonates and simultaneously stabilize polyphosphates, so that, for example, precipitation does not occur in the presence of calcium ions. Furthermore, the polymers obtainable by the inventive process are to stabilize zinc compounds, so that these do not form deposits on the metal surfaces of cooling or heating circuits.

According to the invention, this object is achieved by a process for preparing (meth)acrylic acid copolymers which comprises the following process steps:

(1) free-radical polymerization of (meth)acrylic acid, a polymer I resulting, and (2) amidation of the polymer I resulting from process step (1) by reaction with at least one aminoalkanesulfonic acid.

In process step (2) of the inventive process, the ratio of the carboxylate groups of the polymer I resulting from process step (1) in relation to the aminoalkylsulfonic acid is preferably from 2:1 to 15:1, particularly preferably from 3:1 to 11:1, in particular from 4:1 to 8:1.

Process step (1) is carried out at temperatures of preferably from 100 to 200° C., particularly preferably from 105 to 135° C., in particular from 120 to 125° C.

Process step (1) is preferably carried out in a closed reaction vessel, for example an autoclave. The pressure in process step (1) is thus generally given by the vapor pressure (autogenous pressure) of the components used at the abovementioned temperatures. Independently thereof, if appropriate additional pressure or else reduced pressure can be employed.

The free-radical polymerization of the monomers is preferably performed with the use of hydrogen peroxide as initiator. However, as polymerization initiators, all compounds can alternatively be used which under the reaction conditions form free radicals, for example peroxides, hydroperoxides, peroxodisulfates, peroxodicarboxylic acids, peroxocarboxylic esters and/or azo compounds. If appropriate, in process step (1) of the inventive process, in addition further monomers can be used, for example ethylenically unsaturated monomers which can be copolymerized with (meth)acrylic acid. Suitable copolymers are, for example, monoethylenically unsaturated carboxylic acids such as maleic acid, fumaric acid, itaconic acid, mesaconic acid, methylenemalonic acid and citraconic acid. Other copolymerizable monomers are $C_1$- to $C_4$-alkyl esters of monoethylenically unsaturated carboxylic acids such as methyl acrylate, ethyl acrylate, methyl methacrylate, ethyl methacrylate, hydroxyethyl acrylate, hydroxyethyl methacrylate, hydroxypropyl acrylate, hydroxypropyl methacrylate and hydroxybutyl acrylate. Suitable comonomers are, in addition, alkyl polyethylene glycol (meth)acrylates which are derived from polyalkylene glycols having from 2 to 50 ethylene glycol units, monoallyl ethers of polyethylene glycols having from 2 to 50 ethylene glycol units and allyl alcohol. Other suitable monomers are acrylamide, methacrylamide, N-vinylformamide, styrene, acrylonitrile, methacrylonitrile and/or monomers bearing sulfonic acid groups and also vinyl acetate, vinyl propionate, allyl phosphonate, N-vinylpyrrolidone, N-vinylcaprolactam, N-vinylimidazole, N-vinyl-2-methylimidazoline, diallyldimethyl-ammonium chloride, dimethylaminoethyl acrylate, diethylaminoethyl acrylate, dimethylaminoethyl methacrylate and diethylaminoethyl methacrylate. The basic monomers such as dimethylaminoethyl methacrylate can be used as comonomers, for example, in the form of the bases, as salts with strong acids such as with hydrochloric acid, sulfuric acid or phosphoric acid, or in the form of quaternized compounds. Likewise, the abovementioned acid group-containing monomers can be used in the polymerization in the form of the free acids or as salts, for example the sodium, potassium or ammonium salts.

The inventive process can preferably be carried out in such a manner that the (meth)acrylic acid copolymer has sulfonate groups containing a counterion which is selected from the group consisting of protons, alkali metal ions or ammonium ions. However, in general, the charges of the sulfonate radicals of the (meth)acrylic acid copolymers can be saturated with any desired counterion.

The polymer I obtainable in process step (1) of the inventive process is preferably obtained in a polymer solution which has a solids content of preferably from 10 to 70%, particularly preferably from 30 to 60%, in particular from 45 to 55%.

In a particular embodiment of the inventive process, before the amidation of the polymer I in process step (2), the polymer solution containing the polymer I is adjusted to a pH of preferably from 2.0 to 9.0, particularly preferably from 4.0 to 7.5, in particular from 4.5 to 6.5. Bases which are suitable for this are in principle all bases, but preferably aqueous solutions of alkali metal hydroxides, for example aqueous sodium hydroxide solution.

The amidation (process step (2)) is preferably carried out under a protective gas atmosphere, for example with the use of argon or nitrogen.

Process step (2) of the inventive process is preferably carried out at temperatures of from 140 to 250° C., particularly preferably from 165 to 200° C., in particular from 175 to 185° C. The molar ratio of monomer units in polymer I to aminoalkanesulfonic acid is preferably from 15:1 to 2:1, particularly preferably from 11:1 to 3:1, in particular from 8:1 to 4:1. The pressure in process step (2) is preferably from 1 to 25 bar, particularly preferably from 5 to 17 bar, in particular from 7 to 13 bar.

In a particular embodiment of the inventive process, as aminoalkylsulfonic acid, aminoethylsulfonic acid is used, so that the polymer resulting from process step (2) has units based on aminoethylsulfonic acid. However, any other aminoalkylsulfonic acids can also be used. In this regard reference is made to the above considerations.

The sulfoalkylamide structural units produced by process step (2) of the inventive process are preferably randomly distributed in the (meth)acrylic acid copolymer:

The type of free-radical polymerization reaction in process step (1) decisively affects the distribution of the sulfoalkylamide units between the individual polymer molecules and along a polymer chain. Thus, a mixture of polymer chains of different structure is generally obtained than via the free-radical copolymerization of monomers of corresponding structure. Thus, polymers prepared by polymer-analogous means can differ markedly from polymers which are obtained via the free-radical copolymerization of the monomer acrylamide with acrylic acid and subsequent transamidation of the amide units with aminoalkylsulfonic acid. Also, free-radical copolymerization of acrylic acid, terelactone acid and acrylamide with subsequent transamidation generally leads to other structures. In the case of the last-described polymerization, the distribution of the sulfoalkylamide units is predetermined by the copolymerization parameters of the monomers used in the free-radical copolymerization. The result is that the statistics of the distribution of different functional groups on the polymer backbone in the case of polymers synthesized by polymer-analogous means is generally different than when corresponding groups are introduced by free-radical copolymerization.

The present invention further relates to (meth)acrylic acid copolymers which are obtained by the abovedescribed process.

These (meth)acrylic acid copolymers preferably contain
(a) from 30 to 95% by weight, preferably from 40 to 90% by weight, particularly preferably from 60 to 80% by weight, of a poly(meth)acrylic acid basic framework,
(b) from 5 to 70% by weight, preferably from 10 to 60% by weight, particularly preferably from 20 to 40% by weight, of amide units based on aminoalkylsulfonic acids, where the total weight of the units in the (meth)acrylic acid copolymer is 100% by weight and all weights are based on the (meth)acrylic acid copolymer.

The inventive (meth)acrylic acid copolymers, even in the substoichiometric range, prevent too many calcium ions from penetrating into the film on the metal surfaces of, for example, cooling or heating circuits.

The weight-average molecular weight of the inventive (meth)acrylic acid copolymers is preferably from 1000 to 20 000 g/mol, particularly preferably from 1500 to 10 000 g/mol, in particular from 2000 to 6000 g/mol. The weight-average molecular weight is determined here by gel-permeation chromatography (=GPC) at room temperature using aqueous eluents.

The inventive (meth)acrylic acid copolymers have a K value of preferably from 5 to 50, particularly preferably from 8 to 35, in particular from 11 to 16. The K value was determined by the method of Fikentscher (ISO 174, DIN 53726).

If appropriate, the inventive (meth)acrylic acid copolymers can additionally contain units of other ethylenically unsaturated monomers which are copolymerizable with (meth) acrylic acid. Monomers suitable for this are, for example, monoethylenically unsaturated carboxylic acids such as maleic acid, fumaric acid, itaconic acid, mesaconic acid, methylenemalonic acid and citraconic acid. Other copolymerizable monomers are $C_1$- to $C_4$-alkyl esters of monoethylenically unsaturated carboxylic acids such as methyl acrylate, ethyl acrylate, methyl methacrylate, ethyl methacrylate, hydroxyethyl acrylate, hydroxyethyl methacrylate, hydroxypropyl acrylate, hydroxypropyl methacrylate and hydroxybutyl acrylate. Suitable comonomers are, in addition, alkyl polyethylene glycol (meth)acrylates which are derived from polyalkylene glycols having from 2 to 50 ethylene glycol units, monoallyl ethers of polyethylene glycols having from 2 to 50 ethylene glycol units and allyl alcohol. Other suitable monomers are acrylamide, methacrylamide, N-vinylformamide, styrene, acrylonitrile, methacrylonitrile and/or monomers bearing sulfonic acid groups and also vinyl acetate, vinyl propionate, allyl phosphonate, N-vinylpyrrolidone, N-vinylcaprolactam, N-vinylimidazole, N-vinyl-2-methylimidazoline, diallyldimethylammonium chloride, dimethylaminoethyl acrylate, diethylaminoethyl acrylate, dimethylaminoethyl methacrylate and diethylaminoethyl methacrylate. The basic monomers such as dimethylaminoethyl methacrylate can be used as comonomers, for example, in the form of the bases, as salts with strong acids such as with hydrochloric acid, sulfuric acid or phosphoric acid, or in the form of quaternized compounds. Likewise, the abovementioned acid group-containing monomers can be used in the polymerization in the form of the free acids or as salts, for example the sodium, potassium or ammonium salts.

The amide units based on aminoalkylsulfonic acids can be derived from any desired aminoalkylsulfonic acid. Particularly suitable aminoalkylsulfonic acids are those having from 2 to 12, preferably from 4 to 10, carbon atoms. The amino groups can be primary, secondary or tertiary. As further substituents, the aminoalkylsulfonic acids can have, for example, hydroxyl groups or alkoxy groups or halogen atoms. The alkyl groups can be unsaturated, or preferably saturated, unbranched or branched, or joined to form a ring. The amino groups can be arranged within the chain of the aminoalkyl groups or as pendant substituents or terminal substituents. They can also be a constituent of a preferably saturated heterocyclic ring.

In a preferred embodiment of the present invention, the inventive (meth)acrylic acid copolymer contains the structural unit (II) based on aminoethanesulfonic acid (taurine):

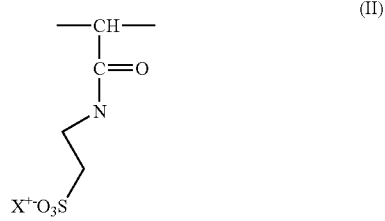
(II)

Generally, the charges of the sulfonate groups of the (meth) acrylic acid copolymers can be saturated with any desired counterion. Preferably, the counterion is selected from the group consisting of protons, alkali metal ions or ammonium ions.

The sulfoalkylamide structural units are preferably randomly distributed in the (meth)acrylic acid copolymer.

The inventive (meth)acrylic acid copolymers differ markedly in their mode of action in water treatment, antiscaling and in corrosion protection from the (meth)acrylic acid polymers of the prior art which are obtained by transamidation of the corresponding (meth)acrylamide polymers with aminoalkylsulfonic acids.

This characteristic mode of action is due to the preferably random distribution of the sulfoalkylamide structural units. The direct amidation of the polyacrylic acid decisively affects the distribution of the sulfoethylamide units between the individual polymer molecules and along a polymer chain. Thus, characteristically, a mixture of polymer chains is obtained which have a different structure than by the free-radical copolymerization of monomers of corresponding structure. Thus, polymers synthesized by polymer-analogous means differ, for example, markedly from polymers which are obtained by the free-radical copolymerization of the monomer acrylamide with acrylic acid and subsequent transamidation of the amide units with aminoethanesulfonic acid. In the case of the last-described polymerization, the distribution of the sulfoethylamide units is predetermined by the copolymerization parameters of the monomers used in the free-radical copolymerization. The result is that the distribution of different functional groups on the polymer backbone is significantly different by free-radical copolymerization than in the polymer-analogous introduction of corresponding groups into previously synthesized polymers.

Furthermore, the present invention relates to a process for stabilizing phosphates, phosphonates and/or zinc ions, for example zinc chloride or zinc phosphate, in aqueous systems, where at least one inventive (meth)acrylic acid copolymer and/or at least one (meth)acrylic acid copolymer obtainable by the inventive process are added to the system. The amount of the polymer in the aqueous system is preferably from 5 to 200 ppm, particularly preferably from 5 to 50 ppm, in particular from 10 to 40 ppm, in each case based on the aqueous system.

The inventive polymers can be metered directly to the aqueous system via one or more metering points or else introduced in a mixture with another component.

The abovedescribed inventive (meth)acrylic acid copolymers and/or (meth)acrylic acid copolymers obtainable by the inventive process can be used for water treatment, antiscale in petroleum production and/or for corrosion inhibition in aqueous systems.

If appropriate it can be expedient to use the inventive (meth)acrylic acid copolymers in formulations. The present invention thus further relates to formulations for water treatment, antiscaling in oil production and/or for corrosion inhibition which comprise at least one inventive (meth)acrylic acid copolymer and/or at least one (meth)acrylic acid copolymer obtainable by the inventive process. If appropriate, the inventive formulations comprise other constituents. Such formulation constituents are, for example:

a) condensed linear and cyclic polyphosphates, such as sodium triphosphate, sodium hexametaphosphate;
b) phosphonates, such as 2-phosphonobutane-1,2,4-tricarboxylic acid, aminotri-(methylenephosphonic acid), 1-hydroxyethylene(1, 1-diphosphonic acid), ethylenediaminetetramethylenephosphonic acid, hexamethylenediaminetetra-methylenephosphonic acid or diethylenetriaminepentamethylenephosphonic acid, c) aminocarboxylates such as nitrilotriacetic acid, ethylenediaminetetraacetic acid, diethylenetriaminepentaacetic acid, hydroxyethylethylenediaminetriacetic acid, methylglycinediacetic acid, gluconate, glucoheptonate, ethylene-diaminedisuccinate and iminodisuccinate;

d) water-soluble polymers, such as homo- and copolymers of sulfonated monomers, such as 2-acrylamido-2-methylpropanesulfonic acid, styrenesulfonic acid or vinylsulfonic acid having a weight-average molecular weight of from 500 to 15 000 or naphthalenesulfonic acid-formaldehyde polycondensates, in addition to other formulation constituents such as surfactants, dispersants, defoamers, corrosion inhibitors, oxygen scavengers and biocides.

The formulation which comprises the inhibitory or dispersive polymer can be added directly to the aqueous system via one or more metering points.

The present invention is illustrated on the basis of the examples hereinafter.

DETAILED DESCRIPTION OF THE PREFERRED EMBODIMENTS

Exemplary Embodiments

1.) Preparation of Inventive Polymers

A polymer is prepared from acrylic acid (process step (1)).

a) In a reactor with nitrogen feed, reflux condenser and metering apparatus, a mixture of 394 g of distilled water and 5.6 g of phosphorous acid (50% strength) is heated to 95° C. internal temperature with nitrogen feed and stirring. Then, (1) 936 g of acrylic acid, (2) 280 g of sodium peroxysulfate solution (10% strength) and (3) 210 g of a 40% strength by weight aqueous sodium hydrogensulfite solution were added continuously in the course of 5 h. After further stirring for one hour at 95° C., the reaction mixture was cooled to room temperature and adjusted to a pH of 4.0 by adding 169 g of 50% strength by weight sodium hydroxide solution.

A clear polymer solution was obtained having a solids content of 54% by weight and a K value of 25 (1% strength by weight aqueous solution, 25° C.).

b) A mixture of 1000 g of the polymer solution from a) (solids content=50%) and 130.47 g of taurine (aminoethanesulfonic acid) was charged into a pressure-stable reaction vessel equipped with agitator, nitrogen feed, temperature sensor, pressure display and venting means. To this mixture were added 110 g of a 50% strength aqueous sodium hydroxide solution. The apparatus was flushed three times with nitrogen and sealed. Then, the mixture was heated with stirring to an internal temperature of 180° C. In the course of this a pressure of approximately 10 bar built up. The mixture was held for 5 hours at this temperature. The mixture was then cooled without expansion. The apparatus was opened and adjusted to a pH of 7.2. This produced a clear yellow solution having a solids content of 49.6% and a K value of 14.6 (1% strength in 3% NaCI solution).

2.) Preparation of the Reference Polymer by Transamidation a) In a reactor equipped with nitrogen feed, reflux condenser and metering apparatus, 180 g of distilled water were initially charged and heated to reflux temperature with nitrogen feed and stirring. The nitrogen stream was shut off and then, in parallel, (1) 180.15 g of acrylic acid, (2) 35.55 g of acrylamide, (3) 143.8 g of a 30% strength by weight aqueous hydrogen peroxide solution and (4) 21.6 g of mercaptoethanol (10% strength by weight in water) were added continuously in the course of 5 h. After further stirring for two hours at reflux temperature, the reaction mixture was cooled to room temperature and adjusted to a pH of 4.0 by adding 169 g of 50% strength by weight sodium hydroxide solution.

A clear solution of poly(acrylamide) [16.6 mol %]-acrylic acid having a solids content of 18.2% by weight and a K value of 11.5 (1% strength by weight aqueous solution, 25° C.) was obtained.

b) The transamidation is performed on the basis of the preparation protocol from the patent EP 0 330 876 B1, example 1, the ratio of COOH to $SO_3H$ in the product being adapted so that the polymer is comparable to example 1 (same taurine content in both polymers, the pH having been increased to 6 to increase the conversion rate):

A mixture of 500 g of the polymer solution from a) (solids content=18.2%) and 27.7 g of taurine (aminoethanesulfonic acid) was charged into a pressure-stable reaction vessel equipped with agitator, nitrogen feed, temperature sensor, pressure indicator and venting means. To this mixture were added 76.7 g of a 50% strength aqueous sodium hydroxide solution. The apparatus was flushed three times with nitrogen and sealed. The mixture was then heated to an internal temperature of 150° C. with stirring. In the course of this a pressure of approximately 10 bar built up. The mixture was held at this temperature for 4 hours. The mixture was then cooled without expansion. The apparatus was opened and adjusted to a pH of 7.2. A clear yellow solution having a solids content of 25.4% and a K value of 13.9 (1% strength in 3% NaCI solution) was obtained.

3.) Use of Polymers for Inhibiting Calcium Phosphate and Calcium Phosphonate a) Calcium phosphate inhibition The basis is the test of inhibitory activity of polymers for use in cooling water circuits.

Equipment: Dr. Lange Photometer, type LP2W
  435 nm filter
  Suction filter apparatus equipped with 0.45 μm membrane filter
  Shaking water bath (GFL model 1083)
  300 ml Lupolen beaker (sealable)
  disposable cuvettes (4 ml, Ratiolab)
  Sartorius balance type LC 4800-P Reagents: vanadate/molybdate—reagent for phosphate determination
  (Merck)
  test solution A: 0.42 g of $H_3PO_4$ solution (5%) made up to 1 l with distilled water
  test solution B: 1.64 g/l of $CaCI_2 0.6 H_2O$
    0.79 g/l of $MgSO_4 0.7 H_2O$
    1.08 g/l of $NaHCO_3$
  polymer solution: 0.1% strength, based on active substance Procedure: 100 ml of the test solution A are placed in the Lupolen beaker,
  2-4 ml of 0.1% strength polymer solution are metered in (10-20 ppm) and then 100 ml of the test solution B are added. After sealing the beaker, it is placed into the shaking bath for 24 h at 70° C. After cooling (approximately 1 h), the sample solutions are filtered off by suction through membrane filters (0.45 μm). 50 ml of the filtered solution are then taken for determining the residual amount of phosphate, by adding 10 ml of the vanadate/molybdate reagent. After a reaction time of 10 minutes, the phosphate content can then be determined using the photometer on the basis of calibration curves.

Concentration of the test solution: GH =5.4 mmol/l
KH=6.42 mmol/l
PO$_4$=10 ppm
polymer=10-20 ppm of active substance

TABLE

| | Inhibition [%] | | |
|---|---|---|---|
| | Dosage (ppm) | | |
| | 15 | 20 | 25 |
| Taurine-modified polymer (according to the invention) | 90 | 96 | 100 |
| Transamidated polymer (not according to the invention) | 38 | 96 | 100 | b) Calcium phosphonate inhibition

The basis is the test of inhibitory action of polymers for use in cooling circuits.

Equipment: Dr. Lange Photometer type LP 2 W, 800 nm filter suction filter apparatus equipped with 0.45 μm membrane filter shaking water bath (GFL model 1083) 300 ml Lupolen beaker (sealable)
Dr. Lange test kit LCK 350
Sartorius balance type LC 4800-P Reagents: Test solution A:
2.2 g/l of HEDP 1% strength WS (Dequest 2010) or 5.7 g/l of PBTC 1% strength WS (Bayhibit AM) or 2.1 g/l of ATMP 1% strength WS (Dequest 2000), make up to 1 l with distilled water Test solution B:
1.64 g/l of CaCl$_2$.6 H$_2$O
0.79 g/l of MgSO$_4$.7 H$_2$O
1.08 g/l of NaHCO$_3$
0.1% polymer solution, based on active substance Procedure: 100 ml of test solution A are placed in the Lupolen beaker, 2-4 ml of 0.1% strength polymer solution are added (10-20 ppm) and then 100 ml of test solution B are added. After the beaker is sealed, it is placed in the shaking bath for 24 hours at 70° C. After it has cooled (approximately 1 h), the test solutions are filtered off by suction through a membrane filter (0.45 μm). The amount of phosphonate inhibited is then determined by Dr. Lange test kit LCK 350.

Concentration of test solution: GH=5.4 mmol/l
KH=6.42 mmol/l
PO$_4$=10 ppm
polymer=10-20 ppm active substance

TABLE

| | Inhibition [%] | | |
|---|---|---|---|
| | Dosage (ppm) | | |
| | 10 | 20 | 30 |
| Taurine-modified polymer (according to the invention) | 68 | 94 | 100 |
| Transamidated polymer (not according to the invention) | 52 | 84 | 89 |

The transamidated polymer is a terpolymer of AA, acrylamide and acrylamidoethanesulfonic acid. The inventive polymer has an increased calcium phosphate inhibition in the lower dosage range compared with the transamidated polymer. This activity is especially marked when substoichiometric amounts are used.

4.) Examples of Formulations for Water Treatment, in Particular for Cooling Water

| a) Polymer/zinc formulation (free from phosphate) | | |
|---|---|---|
| i) Inventive polymer | 40% | (antiscale, zinc stabilization) |
| ii) Zinc chloride | 25% | (anticorrosion) |
| iii) Tolyltriazole | 0.5% | (anticorrosion) |
| iv) Antifoam | 2% | (wetting) |
| v) Biocide | | (control of microorganisms) |
| b) Organic formulation (free from phosphate and heavy metals) | | |
| i) Inventive polymer | 20-25% | (phosphonate stabilization, dispersion of sludge) |
| ii) Phosphonate (HEDP + PBTC) | 10-20% | (antiscale, corrosion inhibition) |
| iii) Tolyltriazole | 2-5% | (anticorrosion) |
| iv) Antifoam | 1-3% | (wetting) |
| v) Biocide | | (control of microorganisms) |
| c) Phosphate/phosphonate formulation | | |
| i) Inventive polymer | 20% | (phosphate inhibition, phosphonate inhibition) |
| ii) Phosphate/phosphonate | 5-15% | (anticorrosion, antiscale) |
| iii) Tolyltriazole | 2-5% | (anticorrosion) |
| iv) Antifoam | 1-3% | (wetting) |

HEDP = 1-hydroxyethane-1,1-diphosphonic acid, sodium salt
PBTC = 2-phosphonobutane-1,2,4-tricarboxylic acid, sodium salt 5.) Determination of the Average Molecular Weight The weight-average molecular weight was determined by gel-permeation chromatography (=GPC) at room temperature using aqueous eluents (0.08 m TRIS buffer (TRIS=tris (hydroxymethyl)aminomethane) having pH=7 in distilled water+0.15 m NaCl+0.01 m NaN$_3$). The samples had a concentration of c=0.1% by mass, and the injection volume was V$_{inj}$=200 μL. The calibration was performed using a broadly distributed sodium polyacrylate calibration mixture. The chromatography column combination consisted of Waters Ultrahydrogel 1000, 500, 500 and TSK PW-XL 5000 (from TosoHaas). A differential refractometer was used for detection.

The invention claimed is:

1. A process for preparing (meth)acrylic acid copolymers, which comprises the steps:
   (1) free-radically polymerizating (meth)acrylic acid, thereby resulting in a polymer I; and
   (2) amidating polymer I resulting from process step (1) by reaction with at least one aminoalkanesulfonic acid to form a sulfonated polymer, wherein the molar ratio of monomers in polymer I to aminoalkanesulfonic acid ranges from 15:1 to 4:1 and the (meth)acrylic acid copolymer comprises:
      (a) from 30 to 95% by weight of a poly(meth)acrylic acid basic framework,
      (b) from 5 to 70% by weight of amide units based on aminoalkylsulfonic acids,
   the total weight of the units in the sulfonated polymer being 100% by weight and all weights being based on the sulfonated polymer.

2. The process according to claim 1, wherein process step (1) is carried out at temperatures ranging from 100 to 200° C.

3. The process according to claim 1, wherein process step (2) is carried out at temperatures ranging from 140 to 250° C.

4. The process according to claim 1, wherein polymer I in solution has a solids content of 10 to 70%.

* * * * *